UNITED STATES PATENT OFFICE.

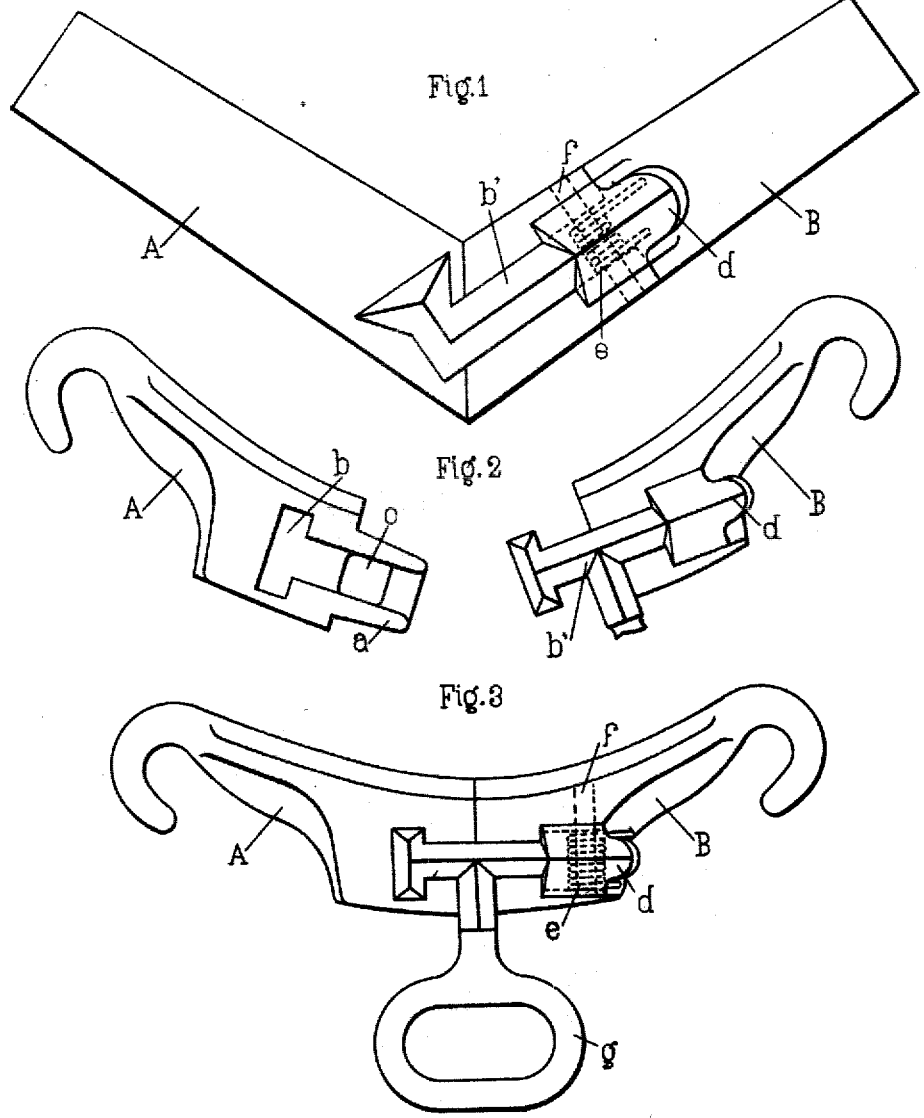

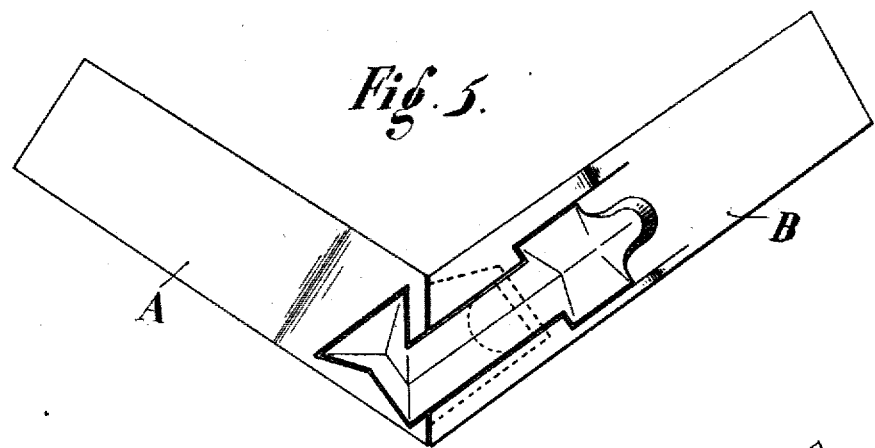
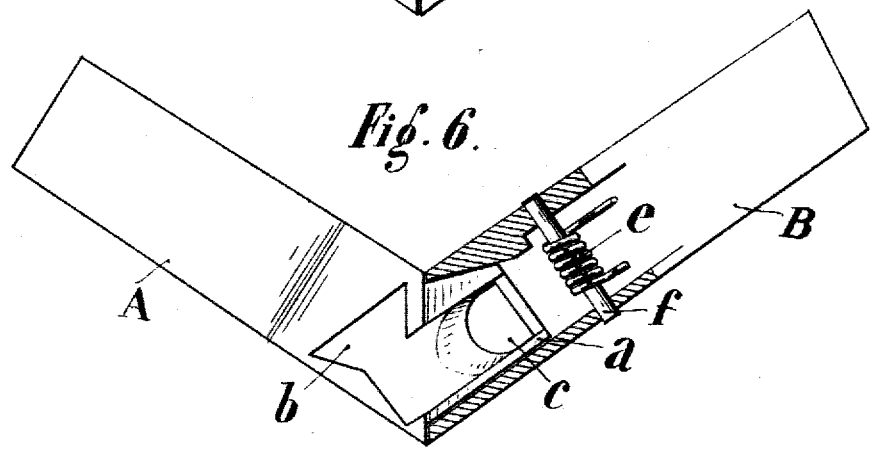
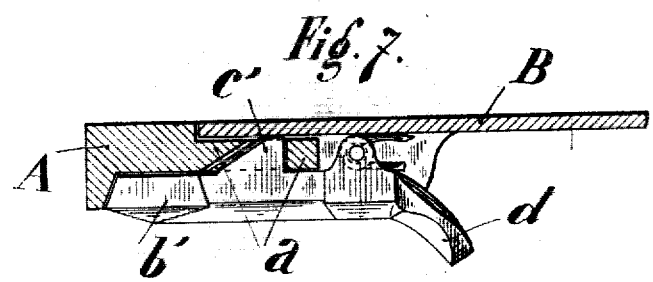

PIERRE GUINDOLLET, OF ST. AMAND, FRANCE.

FASTENING FOR HORSE-COLLARS.

No. 811,714.　　　　Specification of Letters Patent.　　　　Patented Feb. 6, 1906.

Application filed June 17, 1904. Serial No. 213,053.

*To all whom it may concern:*

Be it known that I, PIERRE GUINDOLLET, a citizen of the French Republic, residing at St. Amand, France, have invented certain new and useful Improvements in Fastenings for Horse-Collars, of which the following is a specification, such as will enable others skilled in the art to which it appertains to make and use the same.

This invention relates to improvements in fastenings for horse-collars, by means of which the collars are fastened automatically, firmly, and securely.

A fastening for horse-collars constructed in accordance with the invention comprises a lever which is under the influence of a spiral spring, a projection or catch placed beneath and forming part with the said lever, and plates provided with recesses or slots for receiving the lever and the catch.

In the drawings, Figure 1 represents the new fastening applied to a draft horse-collar and fastened; Fig. 2, the new fastening applied to an English collar and not fastened; Fig. 3, the same fastened. Fig. 4 is a plan of Fig. 2 with the lever raised. Fig. 5 represents the fastening applied to a draft horse-collar and fastened, the dotted lines showing the tongue of the part A inserted in the part B. Fig. 6 is a view of the same, as Fig. 5, the lever being removed. Fig. 7 is a plan section of Figs. 1 and 5.

A and B are two metal plates forming, respectively, the male and the female parts of the fastening device, and more particularly described below. In the male part A is a tongue-piece $a$, which is inserted and slides in the recess $a'$, formed in the opposite female part. This tongue-piece may be either conical or flat. There is also a recess $b$ in the plate A for a spring-lever $b'$, carrying a catch or projection $c'$, which is adapted to engage in an opening $c$ in the tongue $a$.

The lever $b'$ is operated to release the tongue $a$ by pressing on the end $d$. The opposite end of the lever $b'$ terminates in a projecting piece which may be either rectangular or dovetailed and which engages in a recess $b$ in the part A.

$e$ is the spiral spring which is mounted on a fixed rod $f$ and constantly tends to maintain the lever in the locked position, so that the hook or spring-bolt $c'$ may always drop into its recess or slot $c$ and the end of the lever $b'$ into the cavity $b$.

The recess or groove $a'$ forms a receptacle for the tongue-piece $a$, belonging to the male part of the fastening device, and has the same form as that piece.

As will be seen from the drawings and the specification, this fastening device can be applied to all kinds of horse-collars even to English collars, which are thus made as rigid as collars which do not open. In the case of English collars, the martingale-ring $g$ may be added, as shown in the drawing Fig. 3. This ring is placed beneath the fastening device and preferably cast therewith.

As will be understood, this fastening device may be made of any suitable metal.

The action of the device is as follows: In order to close the fastening the tongue-piece $a$, belonging to the male part of the device, is inserted on the recess $a'$, formed in the female part. The lever $b'$ $c'$, which is held in the locked position by the spiral spring $e$, is raised by being pushed until its hook $c'$ falls into the recess $c$ and the piece $b'$ into the recess $b$. In opening the fastening the operation is reversed. The lever is raised by pressing the end $d$ and the tongue-piece $a$ removed from its groove $a'$.

This fastening device has very great advantages: First, the collar can be put on very easily; second, the fastening is automatic, firm, and absolutely secure; third, the fastening can be easily opened—in case of accident, for example, a horse being likely to fall, the lever is raised, the fastening opened, and the animal at once released.

What I claim, and desire to secure by Letters Patent, is—

1. A fastening for horse-collars composed of two metal plates, one of which called male part having a tongue-piece, the said male part being provided with a recess for the lever and with an opening for the lower beak or catch of the lever the female part being provided with a cavity for the tongue-piece and having a lever terminating in a projection device, a spiral spring mounted on a fixed rod, and a lower beak or catch of the lever.

2. A fastening for horse-collars composed of two metal plates one of which called male part having a tongue-piece which penetrates in a corresponding recess of the female part and raises the lever of this part, the said male part being provided with a corresponding recess for the lever, and with an opening corresponding to the lower beak or catch of the lever, the other called female part being provided with a cavity corresponding to the tongue-piece of the male part and having a lever entering the recesses of the male part, a spiral spring operating the lever and a lower beak or catch adapted to engage in the corresponding opening of the tongue-piece of the male part, substantially as herein described and set forth.

In testimony whereof I affix my signature in presence of two witnesses.

PIERRE GUINDOLLET.

Witnesses:
   PIERRE PURA,
   HANSON C. COXE.